United States Patent
Mankovich

(10) Patent No.: US 7,966,004 B2
(45) Date of Patent: Jun. 21, 2011

(54) SYSTEM AND METHOD FOR GENERATING REVENUE FROM A CLASSIFIED ADVERTISEMENT WIRELESS MESSAGING SERVICE

(76) Inventor: Darren Mankovich, Miami Beach, FL (US)

( * ) Notice: Subject to any disclaimer, the term of this patent is extended or adjusted under 35 U.S.C. 154(b) by 619 days.

(21) Appl. No.: 12/104,763

(22) Filed: Apr. 17, 2008

(65) Prior Publication Data

US 2009/0264139 A1 Oct. 22, 2009

(51) Int. Cl.
*H04M 11/10* (2006.01)

(52) U.S. Cl. ............. 455/414.1; 455/466; 455/418; 705/1.1

(58) Field of Classification Search ........... 455/414.1, 455/466, 418; 705/1.1
See application file for complete search history.

(56) References Cited

U.S. PATENT DOCUMENTS

| 2006/0260161 | A1 | 11/2006 | Hamilton | |
|---|---|---|---|---|
| 2007/0011244 | A1 | 1/2007 | O'Neal | |
| 2007/0141977 | A1 | 6/2007 | O'Hanlon | |
| 2007/0192443 | A1* | 8/2007 | Kim | 709/219 |
| 2007/0233662 | A1* | 10/2007 | Bashardoost et al. | 707/3 |
| 2007/0265006 | A1* | 11/2007 | Washok et al. | 455/435.1 |
| 2008/0200160 | A1* | 8/2008 | Fitzpatrick et al. | 455/418 |
| 2008/0214156 | A1* | 9/2008 | Ramer et al. | 455/414.1 |
| 2008/0305778 | A1* | 12/2008 | Aaltonen et al. | 455/414.1 |
| 2009/0216606 | A1* | 8/2009 | Coffman et al. | 705/10 |

* cited by examiner

*Primary Examiner* — Danh C Le
(74) *Attorney, Agent, or Firm* — Malin Haley DiMaggio Bowen & Lhota, P.A.

(57) ABSTRACT

A system and method for generating revenue from a premium service that involves sending classified interactive advertisement information over current and future generation wireless networks to a portable electronic device request by a user/potential buyer that is paid for by the user. The classified advertisement information is sent as a message that is either comprised solely of text or of multimedia files. The service is offered as a premium service, which incurs a user-end charge that creates an alternate source of revenue for major wireless service providers and for the marketers, distributors and publishers of classified advertising. The service is either offered through an on-demand format wherein a charge is incurred per usage, or as a subscription service, wherein a charge is incurred after a specific amount of usage time or a given number of usages, or wherein the user subscribes to periodic alerts until such a time as the user opts-out.

7 Claims, 3 Drawing Sheets

SYSTEM AND METHOD FOR GENERATING REVENUE FROM A CLASSIFIED ADVERTISEMENT WIRELESS MESSAGING SERVICE

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to a system and method for generating a revenue stream paid by the customer or potential buyer through mobile advertising messaging and, more particularly, to a system and method for generating a revenue stream paid by the user/buyer using an interactive mobile messaging advertising service that transmits various types of buyer useful information and in particular information related to classified advertising, wherein the service is adaptable for use for payment of the cell phone advertising messages by the mobile (cell phone) user as a premium rate text message (PSMS) within the networks of all major wireless carriers.

2. Description of Related Art

With the widespread adoption of third generation (3G) mobile phone technologies and the future development and implementation of fourth generation (4G) mobile phone technologies, wireless telephone networks are now capable of supporting the transmission of larger amounts of information to and from a greater number of mobile communication devices. In the past decade, stemming from the creation of the short message service (SMS) communications protocol, text messages have become a popular method of transmitting simple data messages to and from mobile devices such as cell phones through a wireless network. As mobile communication wireless networks have grown to support the transmission of larger volumes of information, the multimedia messaging service (MMS) communication standard was developed to allow for the sending of messages that not only include text, but also multimedia files, such as audio or video files. Due to the advances in the type of file content that is available for transmission, and the growing popularity of text messages and associated multimedia content as a means for communication, SMS and MMS messages are used to transmit information to users that can include news alerts, weather, logos, movie showings, or ring tones. In many cases, the transmitted information is premium content, which involves incurring a separate charge, billed as a premium rate text message (PSMS) in what is known as a value-added service (VAS). VAS is offered by an applications provider who works in conjunction with a wireless service provider, and splits the profits that are made from the premium service with the wireless company.

Through the widespread use of the Internet, advertising and particularly classified advertising has dramatically increased the number of viewers of a particular ad. Simultaneously, due to the increased distribution options for classified advertising in print publications, the internet, and other media, paid classified advertising revenues for these media outlets is decreasing dramatically and these media are looking for methods to increase profits and find new revenue streams. Naturally, to reach a wider customer base in a faster amount of time, advertisers are now looking towards mobile communications as the next medium for advertising. In particular, due to the growing popularity of using text or multimedia messages as a means of transmitting information in what is referred to as messaging, through mobile communication devices, advertisements, especially classified advertisements, are now being communicated to the public through these messaging platforms. Specifically, of the classified ads, the adaptation of transmitting real estate listings to mobile electronic devices is an application with many benefits and a large potential customer base. One of the benefits offered by such a service is that consumers can garner information about a property via text message, a preferred method for consumers, without having to make a phone call. Additionally, this property information can remain stored in the consumer's mobile device text message "in-box" for future reference.

Systems and methods for communicating real estate listings wirelessly to a portable electronic device are listed in the prior art. Specifically, U.S. Publication No. 2006/0260161 Nov. 23, 2006 issued to Hamilton describes an illuminated solar power real estate sign that is preferably suited for placement outside of the property that is for sale. The sign includes a wireless transmitter and a microchip that is used to transmit information relating to the specific property, wirelessly to an electronic device, such as a cell phone, laptop computer, or PDA. The information that is transmitted is stored on the microchip that is coupled to the sign. In order to receive the stored information, an electronic device must be in the range of the wireless transmitter. One disadvantage of this invention is that a user must be in close proximity to the sign, in order to receive the real estate listing information, thus limiting the total number of people that are capable of receiving the information. Furthermore, the present invention does not mention the use of a common platform that supports the transmission of the real estate information on the networks of major wireless service providers, therefore making it even more difficult for a large number of people to receive the information in a common format.

U.S. Publication No. 2007/0011244 Jan. 11, 2007 issued to O'Neal et al. describes a wireless communication system that is adapted for use with the wireless networks that are provided by the major wireless service providers. The invention includes a digital content server that can be accessed through a web based application and is used to input information. This transmitted information is then sent through messages to multiple users in various networks. Through the web based application, a hierarchical web page can be created that includes embedded text and graphic images. The hierarchical web page is sent through a method that combines the SMS standards with the internet protocols that are used by the current generation network systems of cellular telephones. One of the applications of this invention is in the transmission of real estate listings. Such listings can include text and graphics that are inputted into the digital content server by a seller. While this invention does provide a method for maximizing the number of people that are capable of receiving the input real estate information by working on the networks of major wireless service providers, the system is not adapted for the MMS that is now used with the current generations of wireless networks including 3G and the future 4G. As a result, the messages are not capable of including large multimedia files of the property that is being advertised, such as video clips. Another disadvantage of the present invention is that the system does not mention a way of generating revenue.

U.S. Publication No. 2007/0141977 Jun. 21, 2007 issued to O'Hanlon, describes a system and method for sending brochures to a wireless communication device. The brochures are sent as an SMS message, a text message, a photograph MMS message, or an opt-in message or any combination thereof. The transmitted information can include any type of information and are particularly suited to conveying real estate listing information. While the described invention does detail a method of transmitting classified advertisement information wirelessly to portable electronic devices, it fails to mention a method for generating revenue from such a service.

As wireless technology advances, the new types and amount of information that can be transmitted to portable electronic devices continues to grow. Such new types of information include real estate listings that are presented in a messaging format that includes text and multimedia data related to the specific property. A drawback to the real estate advertiser is absorbing the costs of text message calls from prospective customers in setting up a text message advertising response to real estate signage that provides text message access code used by a potential buyer to gather information related to the specific real estate listing using conventional signage. Applicant's improved method provides that the mobile (cell phone) user that is the potential buyer and recipient of the text message real estate information will be charged by the telephone wireless service provider billed as a PSMS (as an option to pay or not receive the text message) shifting the cost burden from the real estate advertiser listing the property to the potential customer that receives the beneficial information. This system and method must be adaptable for use by major wireless networks and meet both SMS and MMS standards while generating additional revenue for the wireless service provider, the marketers distributor, or publisher of the real estate classified advertising, and reducing the cost of advertising to the real estate agency or other advertiser. Media outlet revenue models are trending away from paid advertising revenues and towards end-user on-demand or subscription services wherein the end-user purchases the media they desire. Applicant's improved method capitalizes on the consumer's adoption and growth in purchasing desired media and information on-demand or by subscription.

SUMMARY OF THE INVENTION

A system and method for distributing interactive classified advertisements wirelessly to portable electronic devices over the networks of most major wireless service providers. The interactive classified advertisements are transmitted through messages that support both text and multimedia files. The interactive classified advertisement information is input through a web based application and stored in a database. The information that is stored in the database is then used to transmit the interactive classified advertisement message based on an access code (keyword) request from a mobile user that is sent wirelessly from the mobile electronic device via SMS. Once stored in the database, the interactive advertisement can also be transmitted through the internet and presented onto a suitable display device, such as computer or a mobile device, such as a cell phone, and can generate a premium rate charge to the mobile device user. This information can be but is not limited to real estate sales and rentals, vehicle sales, employment, or personal listings. The information is sent through the network of any major wireless service provider to a portable electronic device in a format that meets the requirements of the SMS protocol, or the MMS standards. The user is charged as a PSMS for the receipt of the text message advertisement or listing information.

The above-mentioned process of sending a classified advertisement in a SMS or MMS format over a wireless network to a mobile electronics device is offered as a premium rate text message (PSMS) VAS. There are two different payment options for the service. In the first option, a user pays a monthly subscription fee that is added onto the wireless service bill. In the second option, a user receives the classified advertisement content in an on-demand format, wherein a charge is created and added to a wireless service bill each time a message is requested and received. Through this service a new end-user pay method is created that provides a constant revenue stream for wireless service providers and marketers, distributors or publishers of classified advertising information. The user pays the cost of the interactive advertisement not the advertiser.

It is one object of the present invention to provide a system and method for distributing interactive classified advertisements wirelessly to portable electronic devices wherein the recipient mobile user pays for the advertisement.

It is still another object of the present invention to provide a premium wireless service that is a constant source of revenue for a marketer, distributor, or publisher of classified advertising by having the mobile user pay for the interactive advertisements.

It is still another object of the present invention to provide a premium wireless service that is a constant source of revenue for a wireless service provider by having the mobile user pay for the interactive advertisements.

It is furthermore another object of the present invention to provide a premium wireless service that is available through a monthly subscription charge that is added on to a wireless service bill.

It is another object of the present invention to provide a premium wireless service that that is available in an on-demand format that incurs a charge that is added on to a wireless service bill, every time the service is used.

In accordance with these and other objects which will become apparent hereinafter, the instant invention will now be described with particular reference to the accompanying drawings.

DETAILED DESCRIPTION OF THE INVENTION

Figure 1:
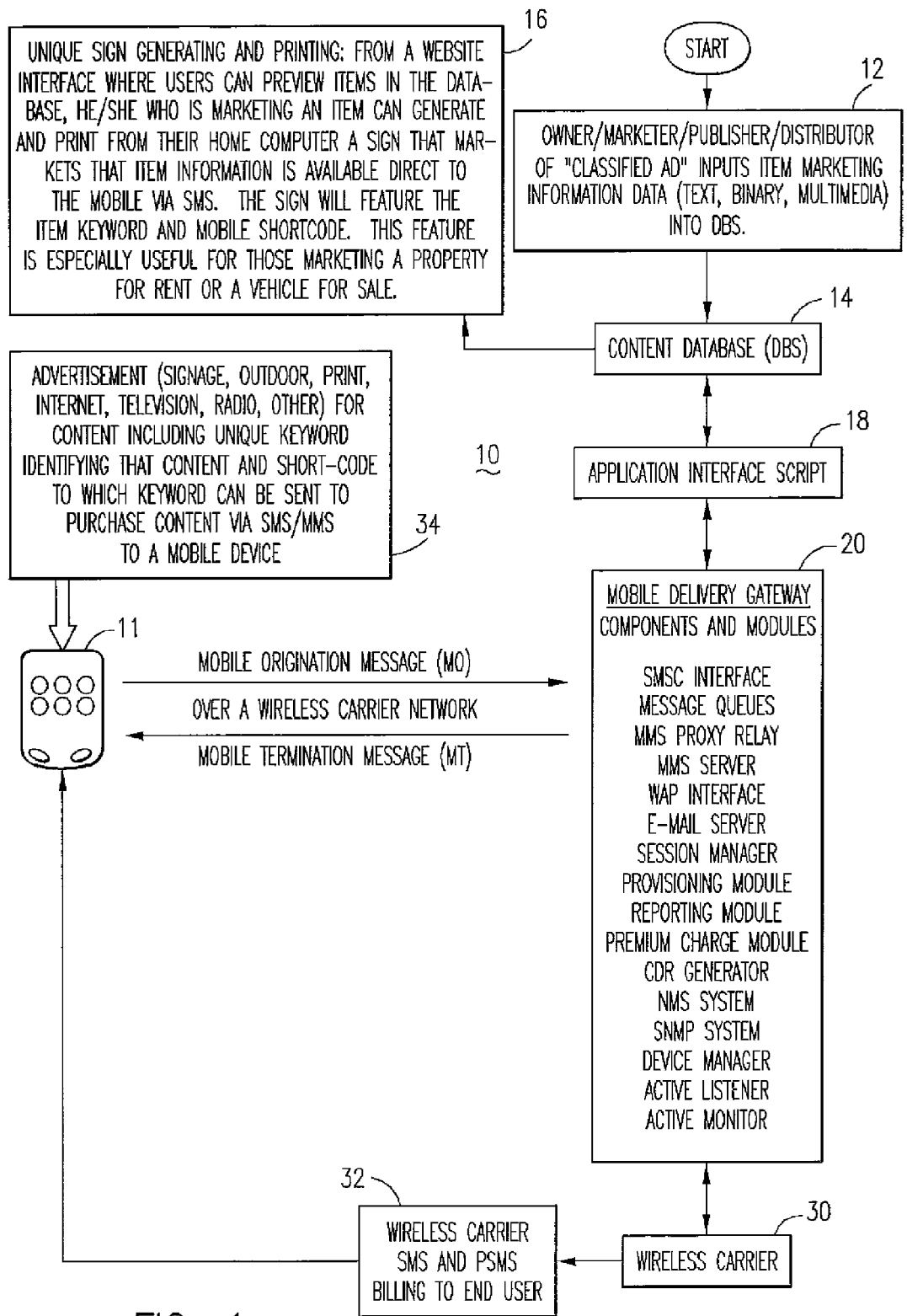
FIG. 1 shows the architecture of the system used to deliver a classified advertisement to a user in a message format to a portable electronic device as a premium service (PSMS).

FIG. 1 shows the architecture of the system 10 that is used to deliver interactive classified advertisements through a wireless network to a portable electronic device.

The invention contains the combination of the following elements: an advertisement 34, a wireless device 11, a content database 14, an application interface script 18, a mobile delivery gateway 20, and a wireless provider 30.

Each message sent from an end-user mobile device coming into the system is a MO (mobile origination). Each message sent from the system to an end-user mobile device is an MT (mobile termination). The combination of MT's/MO's with an end-user is called a "session" or a "message flow".

Information that is related to the classified advertisement 12 is inputted into the content database 14 through any suitable method including but not limited to, a web-based application. The information can include marketing information, or in the specific example of a real estate classified advertisement, can include the area in which the property is located and specific details about the advertised real estate property including pictured or other multimedia files. Once the data is input into the content database, it is assigned a unique keyword. The keyword is used as the information locator when an end-user requests that information through a mobile origination (MO) SMS text message. Types of content databases used include but are not limited to DB2, Informix IDS, Mimer, JavaDB, MySQL, Sybase ASE, or JDataStore.

The content database 14 is connected to a mobile delivery gateway 20 utilizing an application interface script. Examples of appropriate scripting languages include JAVA, ActiveX, Perl, PHP, C/C++, or SMPP.

The application interface script recognizes and processes incoming MO's from the mobile delivery gateway and generates the appropriate response MT's, including any additional data tags that are required for the wireless carriers. To generate the premium rate MT, the interface script "gets" from the database the appropriate classified information associated with that MO keyword and delivers it back to the mobile delivery gateway for relay to the end user mobile device. For each session, the application interface script also manages and relays additional critical information associated with each MT to the mobile delivery gateway. For instance, the application interface script will tag each MT sent with appropriate wireless carrier billing information such as tariffs for each individual MT and, in the case of a premium rate MT billing literals for the wireless carrier to be included on end-user monthly statements. ($0.00 tariff tag for each standard rate MT, and the premium tariff rate for the premium rate MT. The premium rate MT is the MT that contains the actual advertising information). The application interface script also generates and sends the appropriate standard rate MT's such as the initial opt-in MT, or responses to MO "HELP" or "QUIT" keywords.

In FIG. 1, step 16 describes unique sign generating and printing. From a website interface where users can preview items in the database, he/she who is marketing an item can generate and print from their home computer a sign that markets that item information is available direct to the mobile via SMS. The sign will feature the item keyword and mobile shortcode. This feature is especially useful for those marketing a property for rent or a vehicle for sale.

The mobile delivery gateway 20 is the platform that manages each session between all parties. This includes all the components necessary to manage each session: message delivery and receipt, throughput, billing and reporting. The mobile delivery gateway components can include the modules for managing, provisioning, reporting, a premium charge module, a CDR generator, an NMS system, SNMP, a device manager, a session manager, an active listener and active monitor, SMSC interface and message cues, a WAP interface, an MMS proxy-relay, MMS server and MMS storage, and e-mail server.

The mobile delivery gateway 20 can include either a SMSC interface, or a MMS proxy-relay server depending on the type of content of the information and the corresponding message type that is sent based upon the standards of SMS and MMS messaging. The information is sent through the mobile delivery gateway to a portable electronic device. The message can be sent in either a text only SMS format, or a multimedia MMS format. The communications link between the mobile delivery gateway and the portable electronics device is a two way wireless link that allows communication to be initiated from the portable electronic device. The classified information access number (keyword) is listed on the signage for interactive use by the mobile device user.

The use of a two way communication link allows for user response and thus the creation of an on-demand premium service. Furthermore, through a two way communication link, the user can enter the access code (keyword) for a desired advertisement. This keyword is then sent through the mobile delivery gateway 20 to the application interface script 18 which in turn recovers the matching results for the input keyword from the database 14, and sends the recovered classified advertisements as a message back through the mobile delivery gateway to the portable electronic device 11 through either the SMSC interface or the MMS proxy server. The portable electronics device can also receive advertisements 34 detailing the messaging advertisement service of the present invention through either SMS or MMS messages. In reply to the user's initial MO request to begin the session (in which the user will include the specific keyword for that classified information) the user is sent a $0.00 tariff standard rate opt-in MT informing them that receipt of the classified information will result in a premium rate charge billed to the user. A menu will allow the user to accept or deny the charge and the information.

Once the user sends an MO reply "YES" to the opt-in MT indicating acceptance of a PSMS relating to the receipt of the classified advertisement, and particularly real estate listings, the mobile delivery gateway will relay that affirmative user MO reply to the application interface script. The interface script 18 will then retrieve from the database the classified information associated with that keyword and deliver the data back to the mobile delivery gateway as an MT in the format and with the required additional information tags that are specific to the user's wireless carrier and mobile device. The interface script will tag the MT with the necessary PSMS tariff and billing literal for inclusion on the end-users wireless statement which is specific to that user' wireless carrier. The mobile delivery gateway will parse the information that it receives back from the application interface script and manage the remainder of the session.

By creating a charge for the premium service of receiving an interactive classified advertisement message to a portable user electronic device through a wireless network, a new revenue source is generated for wireless service providers and for the marketers, distributors, or publishers of classified information. The user pays for the advertisement, not the advertiser. This is extremely desirable as many wireless service providers and classified advertisement marketers, distributors, and publishers have attracted all possible customers in many countries, and are looking for new ways of growing profits. The present invention generates revenue by expanding the services offered by the wireless service provider and creates a new revenue stream for the marketers, distributors, and publishers of classified advertising. The service of sending and interactive receipt of a classified advertisement message to a portable electronic device generates revenue in two ways. In the first method, the end user is charged for each time the service is used and a message is requested and subsequently delivered.

In a second method, the end user subscribes to a plan that allows the user to opt-in to receive a certain number of advertisement messages for a specific amount of time, or the subscription service will provide the user with periodic MT "alerts" until such a time as the user opts-out. The periodic alerts, which in the case of real estate, might be weekly open house alerts, periodic reduced property price alerts, periodic foreclosure or short-sell alerts, or the like.

Figure 2:
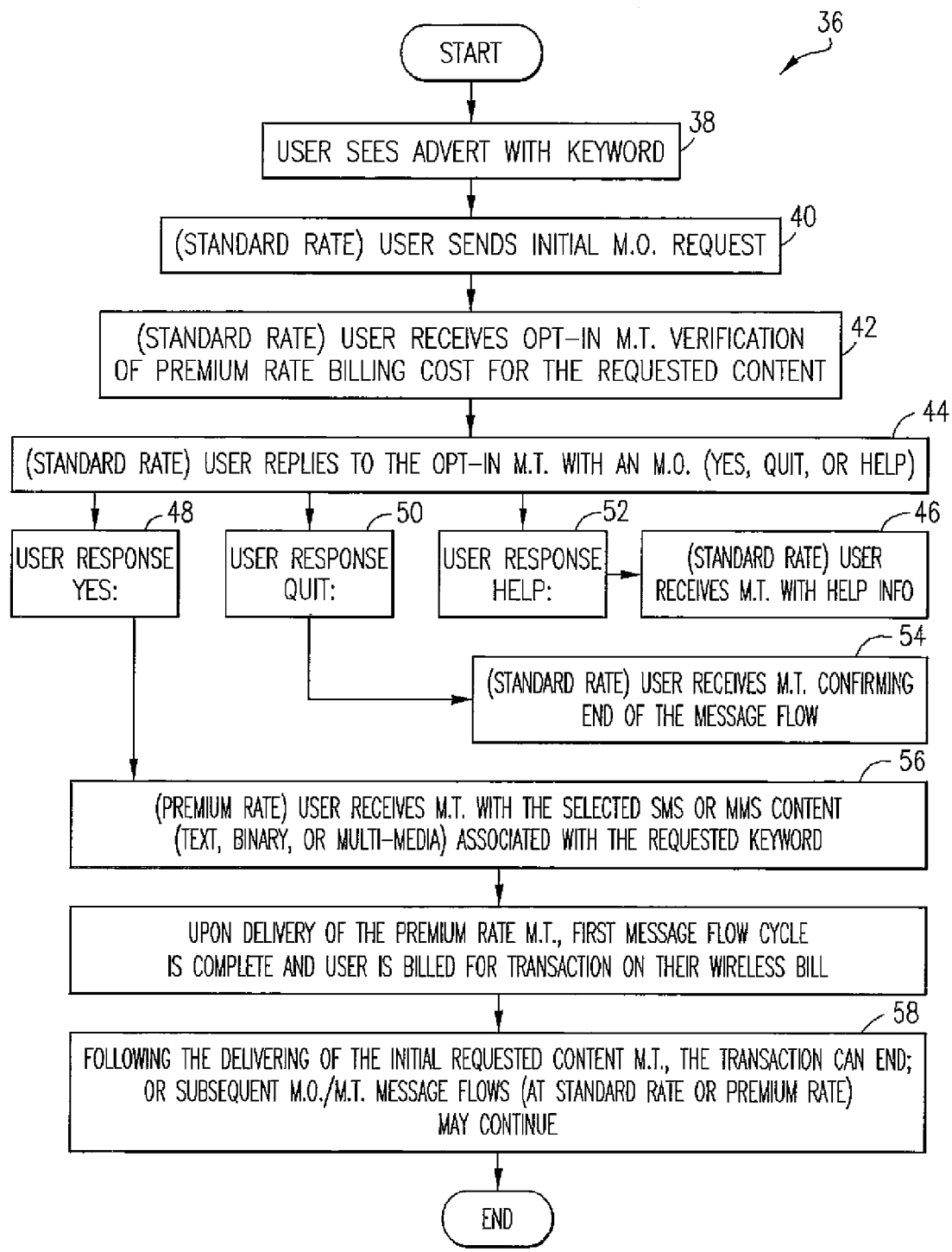
FIG. 2 shows a flow chart of the steps in delivering a classified advertisement message through an on-demand based premium service.

FIG. 2 shows a flow diagram of the steps involved in sending a classified advertisement message to a user through an on-demand service. Through the on-demand service, revenue is generated for the wireless service provider after each use of the service and a classified advertisement message is delivered to the customer. The process 36 begins when the user seeks an advertisement with an access code or keyword 38. The keyword is sent through the wireless network in either a formatted interface that is unique to the service application, or through any other suitable method of sending a simple text containing the keyword to the mobile delivery gateway such as SMS. Regardless of the method used, the sending of the search keyword is sent as a standard rate and does not incur an additional premium charge. Once the initial MO with the keyword is sent 40, the user receives an opt-in mobile termination (MT) message also billed as a standard rate message that does not incur an additional end-user charge, which verifies to the user that the process of returning a classified advertisement message, based upon the input keyword, is a premium service that incurs a charge.

After receiving the opt-in MT, the user then responds with a mobile origination (MO) response that is either yes, quit, or help. If the user responds with a help MO 52, a help MT message is sent to and received by the user 46 that provides detailed information about the service and the subsequent on-demand method of receiving advertisement messages and subsequently incurring charges. If a user responds to the opt-in MT 44 with a quit MO 50, an end MT message is sent to and received by the user 54 that confirms the termination of the message flow. Finally, if the user responds to the opt-in MT 42 with a yes MO, a classified advertisement MT message is sent and received by the user 56 that provides detailed information of the listings returned for the user input search keyword. This classified advertisement MT message can be in either a SMS or MMS format depending on the type of information that is associated with the returned classified advertisement. Particularly in the case of real estate, the message can include detailed picture and video files included with a text description of the listed property. Once the requested classified advertisement MT message is received, a premium rate text message (PSMS) charge is generated and sent to the wireless service provider, and the first transaction session is completed. The system can then end the message flow, or continue with additional MT/MO's with the end-user.

Figure 3:
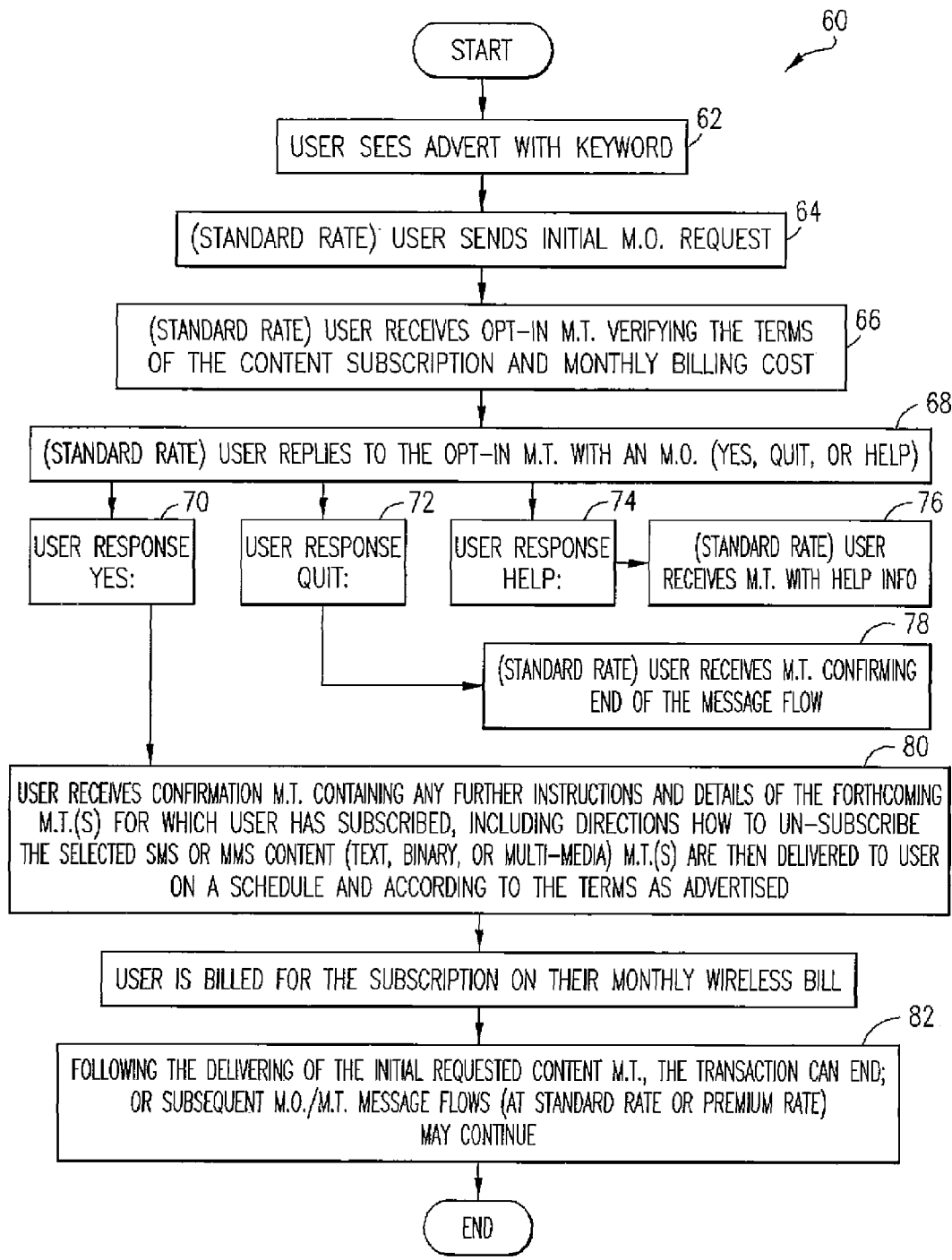
FIG. 3 shows a flow chart of the steps in delivering a classified advertisement message through a subscription based premium service.

FIG. 3 shows a flow diagram of the process steps involved in sending a classified advertisement message to a user through a subscription based service. Through a subscription based service, revenue is generated through a monthly charge that is billed until such a time that the user opts-out of the subscription. The process 60 begins with the user seeing the advertisement with a keyword 62 for a particular subscription alert service. The end-user sends that keyword in an MO via SMS which is received by the mobile delivery gateway and relayed to the application interface script.

Once the initial MO request is received, an opt-in MT message is sent back to the user that details the terms and costs of the subscription for the premium service 66. The user then responds to the opt-in message through either a yes, quit, or help MO 68. If the user responds with a help or quit MO 72, a help or end MT message is sent to and received by the user as a standard rate text. If the user responds yes, message alerts are periodically sent to the end-user's mobile device in compliance with the terms outlined in the subscription service. The subscription charge is added to the standard bill of the wireless service provider as is detailed in the information that is presented to the user through the initial opt-in MT message.

As a practical usage, the real estate example is especially useful. A typical signage listing a house for sale can include a text message access code number (keyword). A potential buyer drives by the house with a mobile device such as a cell phone that includes text messaging. The potential buyer using the cell phone sends an SMS request with the access code in an effort to retrieve more information concerning the listing. The application interface script creates a menu that informs the potential buyer on the cell phone that the text information requested will be billed at a certain rate to the user. The menu then allows the user either to accept or deny the charge of the text message. If accepted by the user, the cost of the advertisement sent to the user is charged to the user's phone bill. The user receives text information and/or photographs or visual information concerning the property that can be stored in the user's mobile device in-box for future reference and can include phone numbers of the agent that is handling the listing. This is a tremendous benefit to a potential buyer of the home as well as it is to the real estate agency that is listing the home. In this particular business model, the real estate agency will not have to pay the advertising costs of providing up to the minute information about the property to a potential buyer who does absorb the cost. This method can improve the amount of information flow to potential buyers and many other markets other than real estate, including the sale of cars which might also have an access number on the for sale sign or any other type of goods or for services that are being sold. Advertising would be encouraged because the costs will not be borne entirely by the advertiser which may greatly limit the amount of advertising done due to the huge costs often involved. Thus, using applicant's invention, a new revenue model and stream can be provided for the mobile service providers, for the marketers, publishers and distributors of advertising, as well as people who are advertising goods and services for sale or lease.

The instant invention has been shown and described herein in what is considered to be the most practical and preferred embodiment. It is recognized, however, that departures may be made therefrom within the scope of the invention and that obvious modifications will occur to a person skilled in the art. Such as, once stored in the database, the interactive advertisement can also be transmitted through the internet and presented onto a suitable display device, such as computer or sent to a mobile device upon request such as a cell phone, and can generate a premium rate charge to a mobile device user.

What is claimed is:

1. A method for interactive classified advertising using a mobile communication device that can provide text messaging to an end-user, the method including creating a new revenue stream while reducing advertising costs comprising the steps of providing an interactive advertisement for content that provides internet access for a user listing an access code for use with a mobile communication device;

providing specific classified advertising content on a database/server accessible over the internet using said access code;

providing a mobile communication device that includes SMS/MMS messaging services for receiving SMS/MMS text messages on line from said content database/server;

providing an application interface scripting program for accessing said content database by said mobile communication device;

providing a wireless carrier for operating said mobile communication device and for providing service for access to said content database using said access code on said advertisement by the mobile communication user; and providing a charging service by said wireless carrier to said mobile communication user each time said content database/server classified advertisement is accessed by a text message sent to said mobile communication device user.

2. A method as in claim 1, including the step of providing an option to said mobile communication user in the form of a menu as to whether to accept or deny the charges for receiving said interactive advertisement from said content database/server through a text message.

3. An advertising method as in claim 2, including the step of:

said wireless carrier customer receiving the billing for the premium rate transaction.

4. A method for advertising as in claim 1, wherein said advertisement that includes the access code (keyword) includes:

said advertisement could include signage, outdoor, print, internet, television, or radio that includes an access code (keyword) that can be accessed by the user having a mobile communication device.

5. A method as in claim 1, wherein:

said content database/server can include owner, marketer, publisher or distributor of a classified interactive marketing information data in text, binary multi-media into the database.

6. A method of advertising as in claim 1, including the step of:

said content database and server containing information concerning a real estate listing that provides information concerning the description of the property that is being listed for sale or for rent.

7. A method as in claim 1, including the steps of:

said content database and server includes information concerning the sale of a vehicle that includes vehicle description and information concerning the vehicle for sale.

\* \* \* \* \*